US009340044B2

(12) United States Patent
Matsushita et al.

(10) Patent No.: US 9,340,044 B2
(45) Date of Patent: May 17, 2016

(54) HOLDING MEMBER, CUTTING APPARATUS AND NON-TRANSITORY COMPUTER-READABLE MEDIUM STORING CUTTING OPERATION CONTROL PROGRAM

(71) Applicant: BROTHER KOGYO KABUSHIKI KAISHA, Nagoya (JP)

(72) Inventors: Hironori Matsushita, Nagoya (JP); Masashi Tokura, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 14/619,516

(22) Filed: Feb. 11, 2015

(65) Prior Publication Data
US 2015/0231901 A1    Aug. 20, 2015

(30) Foreign Application Priority Data

Feb. 14, 2014 (JP) .................................. 2014-026562

(51) Int. Cl.
| | |
|---|---|
| B41J 2/385 | (2006.01) |
| G01D 15/08 | (2006.01) |
| B41J 11/66 | (2006.01) |
| B26D 5/30 | (2006.01) |
| B26D 7/01 | (2006.01) |

(Continued)

(52) U.S. Cl.
CPC ................. *B41J 11/663* (2013.01); *B26D 5/30* (2013.01); *B26D 7/015* (2013.01); *B26D 7/025* (2013.01); *B26F 1/3806* (2013.01); *B26F 1/3813* (2013.01); *H04N 1/04* (2013.01); *B26F 2001/388* (2013.01)

(58) Field of Classification Search
CPC ..... H04N 1/08; H04N 1/0821; H04N 1/0852; H04N 1/0882; H04N 1/193; H04N 1/00761; H04N 1/00; H04N 1/46; H04N 1/004; B41J 11/66; B41J 11/663; B41J 11/666; B41J 11/68; B41J 11/70; B41J 13/16
See application file for complete search history.

(56) References Cited

U.S. PATENT DOCUMENTS

| | | | | |
|---|---|---|---|---|
| 5,422,737 A | * | 6/1995 | Atoji .................... | H04N 1/08 355/75 |
| 5,659,838 A | * | 8/1997 | Ando .................... | G03G 15/507 355/75 |

(Continued)

FOREIGN PATENT DOCUMENTS

| | | |
|---|---|---|
| JP | H02-218594 A | 8/1990 |
| JP | H05-018164 U | 3/1993 |

(Continued)

*Primary Examiner* — Matthew Luu
*Assistant Examiner* — Patrick King
(74) *Attorney, Agent, or Firm* — Fox Rothschild LLP

(57) ABSTRACT

A holding member includes a base, a transparent sheet, first, second and third signs. The base has an adhesive part on which a sheet-shaped object is removably placed. The sheet holds the object between the base and itself. The first sign indicates a type of the holding member. The second sign indicates that the sheet is located at a closed position. The second sign on the sheet and the first and third signs on the base are located at a front part of the base with respect to an insertion direction of the holding member when the sheet is located at a closed position. The first to third signs are located between a front end of the adhesive part and a front end of the base with respect to the insertion direction when the sheet is located at the closed position.

5 Claims, 12 Drawing Sheets

(51) Int. Cl.
*B26D 7/02* (2006.01)
*B26F 1/38* (2006.01)
*H04N 1/04* (2006.01)

(56) References Cited

U.S. PATENT DOCUMENTS

| | | | | |
|---|---|---|---|---|
| 6,043,866 | A * | 3/2000 | Kawai | H04N 1/00795 355/75 |
| 7,502,147 | B2 * | 3/2009 | Suzuki | H04N 1/00002 358/405 |
| 8,526,079 | B2 * | 9/2013 | Ciardullo | H04N 1/00588 358/474 |
| 2012/0247293 | A1 | 10/2012 | Nagai et al. | |
| 2013/0255458 | A1 | 10/2013 | Kawase et al. | |
| 2013/0321877 | A1 | 12/2013 | Nagai et al. | |

FOREIGN PATENT DOCUMENTS

| | | |
|---|---|---|
| JP | H10-164310 A | 6/1998 |
| JP | 2009-284091 A | 12/2009 |

\* cited by examiner

HOLDING MEMBER, CUTTING APPARATUS AND NON-TRANSITORY COMPUTER-READABLE MEDIUM STORING CUTTING OPERATION CONTROL PROGRAM

CROSS-REFERENCE TO RELATED APPLICATIONS

This application is based upon and claims the benefit of priority from the prior Japanese Patent Application No. 2014-026562 filed on Feb. 14, 2014, the entire contents of which are incorporated herein by reference.

BACKGROUND

1. Technical Field

The present disclosure relates to a holding member holding a sheet-shaped object, a cutting apparatus provided with the holding member and a non-transitory computer-readable medium for the cutting apparatus, storing a cutting operation control program.

2. Related Art

For example, an image reader such as copying machines, facsimile machines and scanners includes a transfer mechanism which transfers an object to be read, such as paper and an image scanner extending in a direction perpendicular to a transfer direction. This type of image reader uses a holding member to hold a sheet-shaped object.

The holding member includes a mat board having an adhesive layer to which a piece of paper such as voucher is affixed and a transparent sheet covering the mat board. The transparent sheet is fixed by thermocompression bonding to a front side of the mat board with respect to an insertion direction, which side constitutes one side of the mat board. As a result, a part of the transparent sheet other than its bonded part is removable form the mat board. Thus, the paper strip is affixed to the adhesive layer with the transparent sheet being open thereby to be fixedly held or sandwiched by the holding member. The holding member is then inserted into the image scanner, and an image on the paper strip is read while the holding member is transferred by the transfer mechanism.

A cutting apparatus called "cutting plotter" is known which includes a holding member on which an object such as paper or cloth is held and cut into a desirable shape. It has been proposed that an image scanning device such as an image sensor should be provided on the cutting apparatus. As a result, a position, size, outline or the like of the object held on the holding member can be detected, and an original image to generate cutting data is read with a result that a cut line can be recognized. In this case, the above-mentioned conventional holding member can be used to read the image.

SUMMARY

However, when the conventional holding member is used for the cutting operation, there is an inconvenience that the transparent sheet would also be cut. In view of this drawback, a holding member dedicated to the cutting and provided with no transparent sheet needs to be used in the cutting operation. However, there is a possibility that a holding member having a transparent sheet may erroneously be used with the transparent sheet being closed.

Therefore, an object of the disclosure is to provide a holding member which is used with a cutting apparatus including an image scanning device and includes transparent sheet on an upper surface of a base and which can effectively prevent the transparent sheet from being erroneously cut, a cutting apparatus provided with the holding member and a non-transitory computer-readable medium storing a cutting operation control program for the cutting apparatus.

The disclosure provides a holding member including a base, a transparent sheet, first, second and third signs. The base has an adhesive part on which a sheet-shaped object is removably place. The base has a rectangular shape. The transparent sheet is configured to hold the object between the base and itself. The object is held by the holding member. The transparent sheet has a rectangular shape and has a proximal end fixed to a rear part of the base with respect to the insertion direction of the holding member and is movable between a closed position where the transparent sheet is laid over the adhesive part and an open position where the adhesive part is exposed. The object is cut by a cutting apparatus when the transparent sheet is located at the closed position. The object is scanned by an image scanning device included in the cutting apparatus when the transparent sheet is located at the closed position or the open position. The first sign is provided on the base to indicate a type of the holding member and is a mark optically detectable by an image scanning device included in a cutting apparatus. The second sign is provided on the transparent sheet to indicate that the transparent sheet is located at the closed position. The second sign is a mark optically detectable by the image scanning device. The third sign is provided on the base to indicate an insertion direction in which the holding member is inserted into the cutting apparatus. In the above-described holding member, the second sign on the transparent sheet and the first and third signs on the base are located at a front part of the base with respect to the insertion direction of the holding member when the transparent sheet is located at the closed position. Further, the adhesive part has a rectangular shape, and the first, second and third signs are located between a front end of the adhesive part with respect to the insertion direction and a front end of the base with respect to the insertion direction when the transparent sheet is located at the closed position.

The disclosure also provides a cutting apparatus including a holding member holding a sheet-shaped object and including a base having an adhesive part on which the object is removably placed, a transparent sheet configured to hold the object between the base and itself, the transparent sheet having a proximal end fixed to a first side of the base and being movable between a closed position where the transparent sheet is laid over the adhesive part and an open position where the adhesive part is exposed, a first sign provided on the base to indicate a type of the holding member, and a second sign provided on the transparent sheet to indicate that the transparent sheet is located at the closed position. The apparatus further includes an image scanning device configured to scan an image of the object held by the holding member, a cutting mechanism configured to cut the object held by the holding member, a detection device configured to detect the first and second signs, an informing device configured to inform of information about at least the holding member, and a control unit configured to cause the informing device to inform that the cutting mechanism is unable to perform a cutting operation, when the holding member is inserted into the cutting apparatus and the first and second signs are detected by the detection device and to cause the cutting mechanism to perform the cutting operation when the first sign is detected by the detection device and the second sign is undetected by the detection device.

The disclosure further provides a non-transitory computer-readable medium storing a cutting operation control program for a cutting apparatus including an image scanning mechanism configured to scan a sheet-shaped object held between a base and a transparent sheet by a holding member and a cutting mechanism configured to cut the object, the cutting operation control program causing a computer to perform processes to control a cutting operation for the object. The program causes the computer to perform a first sign detecting routine of detecting, by a detection mechanism, a first sign to indicate a type of the holding member inserted into the cutting apparatus, a second sign detecting routine of detecting, by the detection mechanism, a second sign provided on a transparent sheet of the holding member inserted into the cutting apparatus and indicating that the transparent sheet is located at a closed position, an informing routine of causing the informing mechanism to inform of a message saying that the cutting mechanism is unable to perform a cutting operation, when the detection mechanism detects the first sign in the first sign detecting routine and the second sign in the second sign detecting routine, and a cutting operation performing routine of causing the cutting mechanism to perform a cutting operation when the detection mechanism detects the first sign in the first sign detecting routine and the detection mechanism does not detect the second sign in the second sign detecting routine.

DETAILED DESCRIPTION

Figure 1:
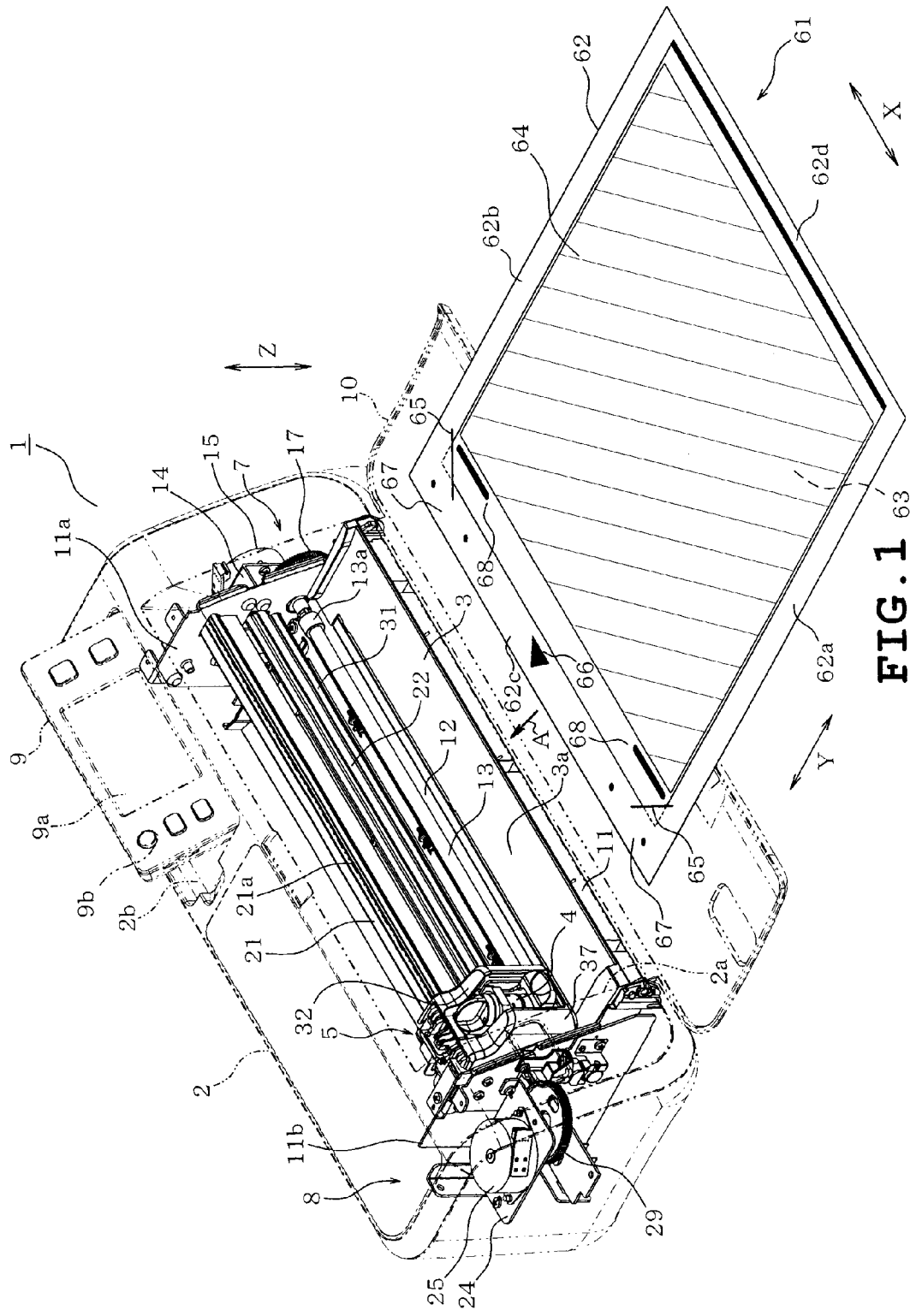
FIG. 1 is a perspective view of a cutting apparatus together with a holding member according to a first embodiment, showing an inner structure of the cutting apparatus.

A first embodiment will be described with reference to FIGS. 1 to 11. Referring to FIG. 1, a cutting apparatus 1 of the embodiment includes a body cover 2, a platen 3 enclosed by the body cover 2 and a cutting head 5 serving as a cutting mechanism having a cutter cartridge 4 (see FIGS. 4, 5 and so on). The cutting head 5 is configured to cut a sheet-shaped object W (see FIG. 6) such as paper or cloth. The cutting head 5 includes a carriage 19 and a cartridge holder 32 as will be described in detail later. The cutter cartridge 4 is detachably attached to the cartridge holder 32. The cutting apparatus 1 further includes a scanner 6 (see FIGS. 2 and 7) configured to scan an image of the object W as will be described later.

The cutting apparatus 1 includes a holding member 61 to hold the object W (see FIG. 6) as shown in FIG. 1. The holding member 61 includes a base 62 formed into the shape of a rectangular thin plate as a whole and holds the object W on the base 62 in a placed state, as will be described in detail later. Two types of holding members 61 holding the object W are prepared in the embodiment, that is, the holding member 61 used for scanning an image of the object W and cutting the object W and a holding member (not shown) used only for cutting the object W. More specifically, at least two types of holding members are prepared and the user can use the holding members according to intended purposes.

The body cover 2 is formed into the shape of a horizontally long rectangular box having a front slightly inclined obliquely downward, as shown in FIG. 1. The front of the body cover 2 has a front opening 2a which is open horizontally long. The front of the body cover 2 includes a lower part on which is rotatably mounted a front cover 10 for opening/closing the front opening 2a. The holding member 61 is inserted into the cutting apparatus 1 from the front with the front cover 10 being open to be set on the platen 3, as shown in FIG. 1.

An operation panel 9 is mounted in a right part of the top of the body cover 2. The operation panel 9 is formed into a horizontally long rectangular shape and provided with a display 9a comprising a full color liquid crystal display. The operation panel 9 is also provided with a switch device 9b for the user to operate to enter instructions, selection and inputs. The switch device 9b includes a plurality of push-button switches and a touch panel mounted on the surface of the display 9a.

Figure 2:
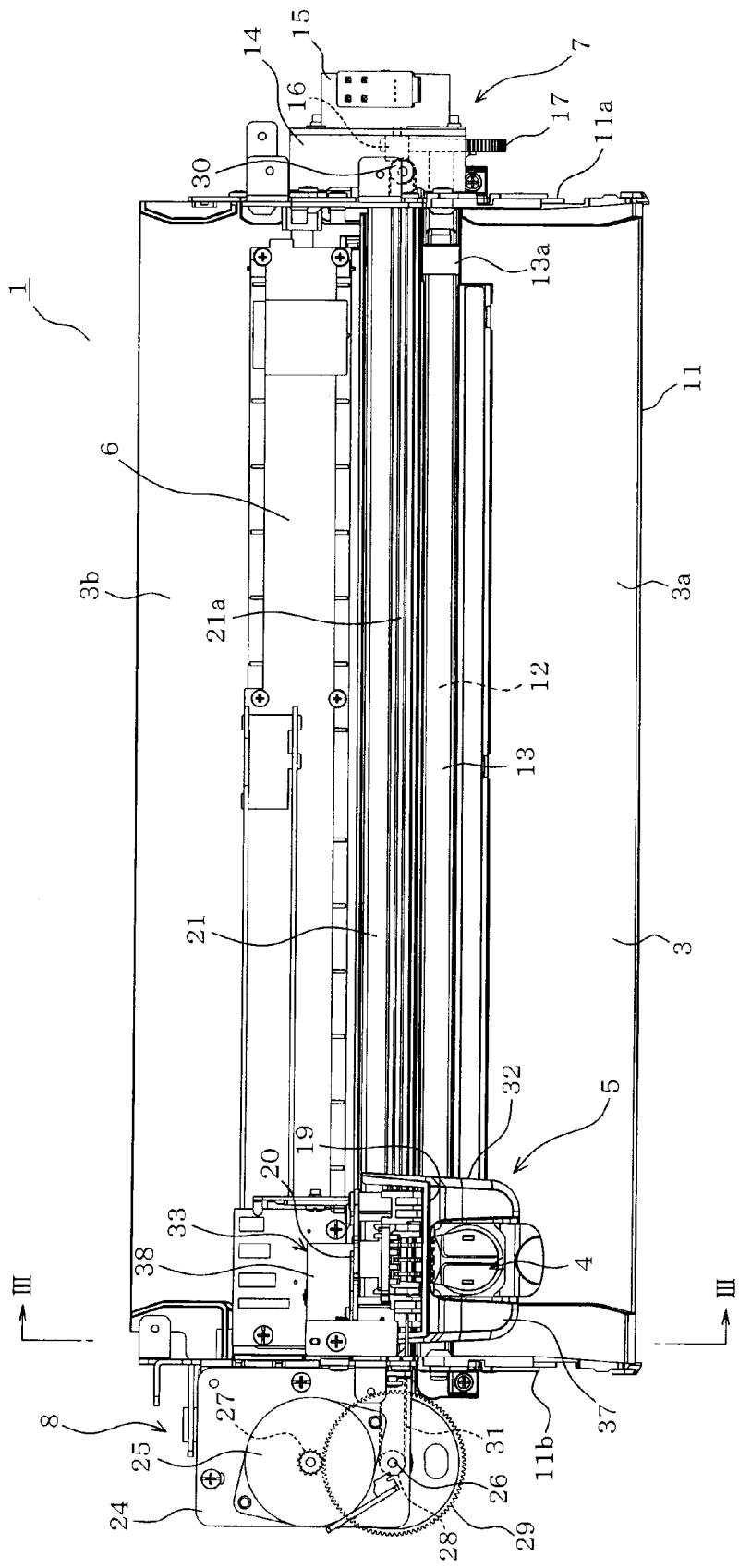
FIG. 2 is a plan view of the cutting apparatus, showing the inner structure thereof.

An apparatus frame 11 is provided in the body cover 2 as shown in FIG. 2. The platen 3 is mounted on the apparatus frame 11. The platen 3 includes a front platen 3a and a rear platen 3b as shown in FIG. 2. The platen 3 has a horizontal upper surface along which a holding member 61 holding the object W is transferred in a placed state. The apparatus frame 11 includes a right sidewall 11a and a left sidewall 11b both located at right and left sides of the platen 3 so as to be opposed to each other, respectively. A transfer mechanism 7 and a cutter moving mechanism 8 are mounted on the apparatus frame 11. The transfer mechanism 7 is configured to transfer the holding member 61 on the platen 3 in a front-back direction (the Y direction). The cutter moving mechanism 8 is configured to move the cutting head 5, namely, the carriage 19 in a right-left direction (the X direction) intersecting with (perpendicular to, in this case) a transferring direction of the holding member 61. Directions will be defined in the embodiment as follows. A transferring direction of the transfer mechanism 7 is referred to as the Y direction that is the front-back direction. A moving direction of the cutter moving mechanism 8 is referred to as the X direction that is the right-left direction. A direction perpendicular to the front-back direction and the right-left direction is referred to as a Z direction that is an up-down direction.

The transfer mechanism 7 will be described. A driving roller 12 and a pinch-roller shaft 13 both extending in the X direction are provided between the right sidewall 11a and the left sidewall 11b, as shown in FIGS. 1 and 2. The driving roller 12 and a pinch-roller shaft 13 are located in a space defined between the front and rear platens 3a and 3b and arranged up and down. The driving roller 12 has two ends rotatably supported on the right and left sidewalls 11a and 11b respectively. The driving roller 12 has an upper end which is disposed substantially at the level of the upper surface of the platen 3. The right end of the driving roller 12 extends through the right sidewall 11a and has a distal end to which a driven gear 17 having a larger diameter is secured, as shown in FIG. 2.

A mounting frame 14 is mounted on an outer surface of the right sidewall 11a as shown in FIG. 2. A Y-axis motor 15 comprising a stepping motor, for example is mounted on the mounting frame 14. The Y-axis motor 15 has an output shaft to which a driving gear 16 having a smaller diameter is fixed. The driving gear 16 is brought into mesh engagement with the driven gear 17 with the result that the driving roller 12 is rotated by the rotation of the Y-axis motor 15.

The pinch-roller shaft 13 has two ends which are supported on the right and left sidewalls 11a and 11b so as to be rotatable and slightly displaceable in the up-down direction (a direction of thickness of the object W and the like, respectively. The pinch-roller shaft 13 is normally biased by compression coil springs (not shown) provided on the respective outer surfaces of the right and left sidewalls 11a and 11b downward, namely, in a direction toward the driving roller 12. Further, as shown in FIGS. 1 and 2, two rollers 13a having slightly larger diameter are mounted on portions of the pinch-roller shaft 13 located near the right and left ends of the pinch-roller shaft 13, respectively, although only the right one is shown.

Right and left edges of the holding member 61 are held between the driving roller 12 and the rollers 13a as the result of the above-described construction, respectively. The transfer mechanism 7 transfers the holding member 61 in the Y direction by the rotation of the driving roller 12 with drive of the Y-axis motor 15 while the right and left edges of the holding member 61 are held between the driving roller 12 and the rollers 13a respectively. A detection sensor 76 (shown only in FIG. 7) is provided in the vicinity of the platen 3 to detect insertion of a front end of the holding member 61 from the front between the driving roller 12 and the rollers 13a.

Figure 3:
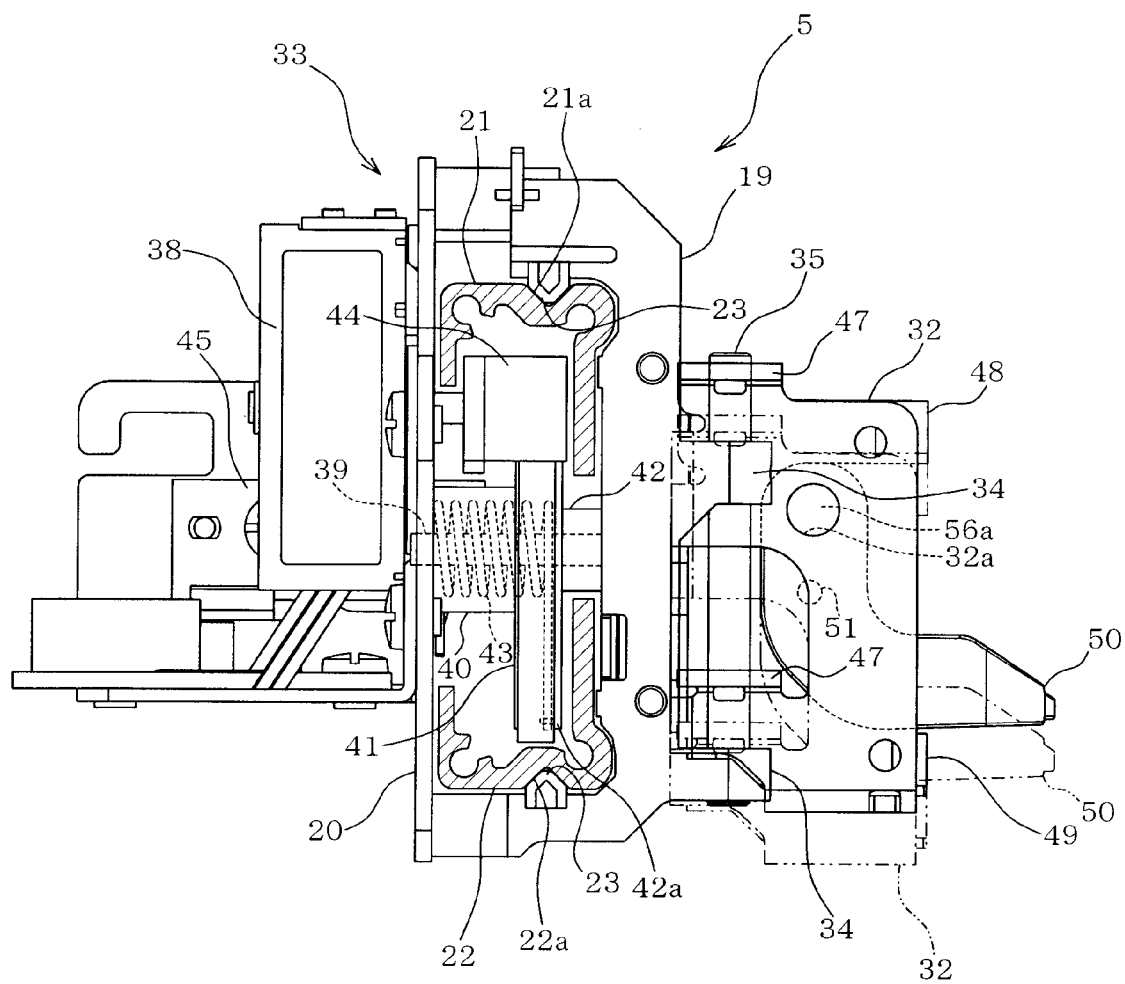
FIG. 3 is a longitudinal left section taken along line III-III in FIG. 2.

The cutter moving mechanism 8 moves the cutting head 5 (the carriage 19) in the X direction and has the following construction. Guide rails 21 and 22 are mounted between the right and left sidewalls 11a and 11b as shown in FIGS. 1 to 3. The guide rails 21 and 22 are located slightly rearwardly upward relative to the pinch-roller shaft 13 so as to extend substantially in parallel with the pinch-roller shaft 13, namely, in the X direction. The guide rails 21 and 22 are arranged up and down as shown in FIG. 3. The upper guide rail 21 has a generally downwardly open C-shaped cross section, and the lower guide rail 22 has a generally upwardly open C-shaped cross section.

The upper guide rail 21 has an upper surface formed with a guide groove 21a extending in the right-left direction and having a generally V-shaped cross section, as shown in FIG. 3. The lower guide rail 22 also has an underside formed with a guide groove 22a extending in the right-left direction and having a generally V-shaped cross section. The carriage 19 includes an upper part and a lower part both provided with protrusions 23 formed integrally therewith, respectively, as shown in FIG. 3. The protrusions 23 are formed to extend in the right-left direction and to engage the guide grooves 21a and 22a respectively. Each protrusion 23 has an angle section. The protrusions 23 movably engage the guide grooves 21a and 22a so as to hold the guide rails 21 and 22 therebetween from above and underneath, with the result that the carriage 19 is supported to be movable in the right-left (X) direction.

A horizontal mounting frame 24 is fixed to a rear part of the outer surface of the left sidewall 11b as shown in FIGS. 1 and 2. An X-axis motor 25 is mounted on the left mounting frame 81b so as to be located in the rear and to be directed downward. A vertically extending pulley shaft 26 is mounted on a front part of the mounting frame 24. The X-axis motor 25 has an output shaft to which a driving gear 27 having a smaller diameter is fixed. A timing pulley 28 and a driven gear 29 having a larger diameter are rotatably supported on the pulley shaft 26. The driven gear 29 is mesh engaged with the driving gear 27. The timing pulley 28 and the driven gear 29 are rotated together.

A timing pulley 30 is rotatably mounted on the right mounting frame 14 so that an axis thereof is directed in the up-down direction, as shown in FIG. 2. An endless timing belt 31 extends between the timing pulleys 30 and 28 horizontally in the right-left direction. The timing belt 31 has a middle part connected to a mounting part (not shown) of the carriage 19. The cutter moving mechanism 8 is thus constructed, so that the timing belt 31 is moved via the driven gear 29 and the timing pulley 28 by rotation of the X-axis motor 25. The carriage 19, that is, the cutting head 5 are moved in the right-left direction by the movement of the timing belt 31.

The cutting head 5 includes a cartridge holder 32 located in front of the carriage 19 and an up-down driving mechanism 33 located in the rear of the carriage 19. The up-down driving mechanism 33 is configured to drive the cartridge holder 32 in the up-down direction (the Z direction). The construction of the cutting head 5 will now be described with reference to FIGS. 3 to 6. The carriage 19 includes a generally C-shaped main part as viewed from a side and a rear plate 20 which is disposed to close the rear thereof. The carriage 19 is formed into a rectangular box shape so as to surround the guide rails 21 and 22 back and forth and up and down. The carriage 19 has an upper wall and a lower wall further having inner surfaces formed with the protrusions 23 respectively.

Figure 4:
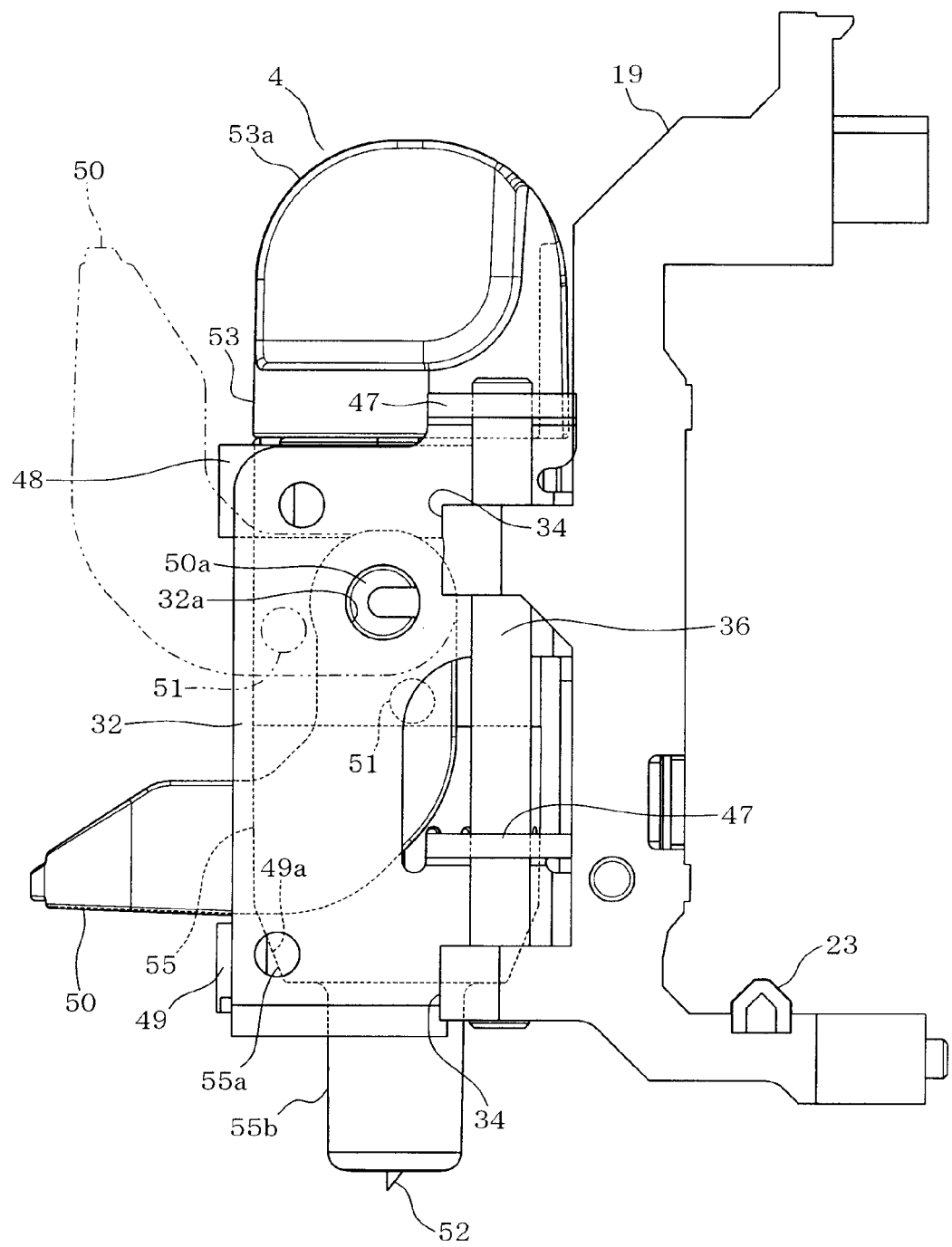
FIG. 4 is a right side view of a cutting head.

The carriage 19 has a front formed with four supports 34 protruding frontward as shown in FIGS. 3 and 4. Two of the supports 34 are located at upper and lower parts of a right side of the front of the carriage 19 respectively, and the other two supports 34 are located at upper and lower parts of a left side of the front of the carriage 19 respectively. The supports 34 are formed integrally with the carriage 19. A shaft 35 extends through the left supports 34 in the up-down direction and is fixed in the extending state as shown in FIG. 3. Another shaft 36 extends through the right supports 34 in the up-down direction and is fixed in the extending state as shown in FIG. 4. The cartridge holder 32 is supported by the shafts 35 and 36 so as to be movable in the up-down direction as will be described later. The cartridge holder 32 is movable between a lowered position (shown by alternate long and two short dashes line in FIG. 3) and a raised position (shown by solid line in FIG. 3). When the cartridge holder 32 is located at the lowered position, the object W is cut by a cutter 52 which will be described later. When the cartridge holder 32 is located at the raised position, a blade edge 52a of the cutter 52 is spaced upward from the object W by a predetermined distance.

A Z-axis motor 38 constituting part of the up-down moving mechanism 33 is mounted on the rear plate 20 of the carriage 19 as shown in FIG. 3. The Z-axis motor 38 is located at a slightly upper part of the rear plate 20 and is directed frontward. The Z-axis motor 38 comprises a stepping motor, for example. The Z-axis motor 38 has an output shaft further having a distal end which is located in the carriage 19 and to which a driving gear 44 having a smaller diameter is fixed. A gear shaft 39 extending in the front-back direction is mounted in a vertical middle of interior of the carriage 19 and is located in the lower right of the driving gear 44.

A driven gear 41 mesh engaged with the driving gear 44 is rotatably supported on the gear shaft 39 in the carriage 19. A pinion gear 42 is rotatably supported on the gear shaft 39 and is located on a front part of the gear shaft 39. A cylindrical part 40 having a smaller diameter is mounted on a rear surface of the driven gear 41 coaxially integrally with the driven gear 41. The cylindrical part 40 has a hollow interior continuous into the driven gear 41 to be open at the front of the driven gear 41. A torsion coil spring 43 is housed in the hollow interior of the cylindrical part 40 to be located around the gear shaft 39.

The pinion gear 42 has a flange 42a formed integrally on the rear surface thereof and having a larger diameter. The flange 42a slidably covers the front opening of the driven gear 41. The torsion coil spring 43 has a rear end locked on an inner periphery of the cylindrical part 40 located at the driven gear 41 side and a front end locked on the flange 42a of the pinion gear 42. The pinion gear 42 is in mesh engagement with a rack (not shown) formed integrally with the cartridge holder 32 and extending in the up-down direction.

The up-down driving mechanism 33 is thus configured of the Z-axis motor 38, the driven gear 41, the pinion gear 42, the torsion coil spring 43, the rack and the like. Upon normal rotation of the Z-axis motor 38, for example, the rack is moved via the driving gear 44, the driven gear 41, the torsion coil spring 43 and the pinion gear 42 with the result that the cartridge holder 32 is lowered. Upon reverse rotation of the Z-axis motor 38, the cartridge holder 32 is raised. In this case, the torsion coil spring 43 is compressed when the cartridge holder 32 is lowered, although a detailed description will be eliminated. As a result, a predetermined cutter pressure is obtained.

A raised position detection sensor 45 (see FIG. 7) is provided on the rear surface of the carriage 19 although not shown in detail in the drawings. The raised position detection sensor 45 detects the cartridge holder 32 located at the raised position. The raised position detection sensor 45 comprises an optical sensor, for example. Further, a cartridge detection sensor 46 (see FIG. 7) is provided on a front wall of the carriage 19. The cartridge detection sensor 46 detects the cutter cartridge 4 attached to the cartridge holder 32. The cartridge sensor 46 comprises a microswitch, for example.

Figure 5:
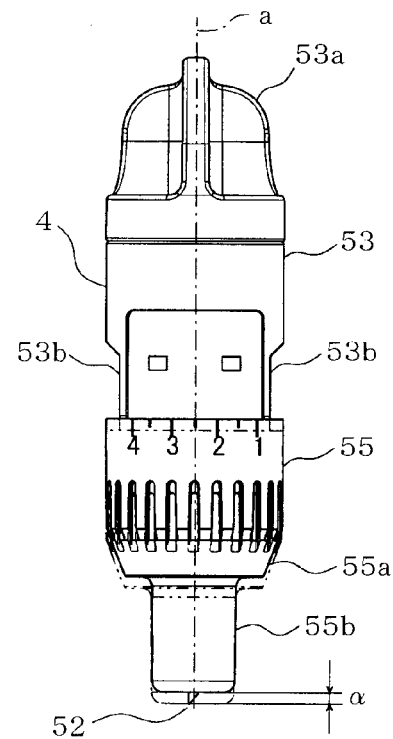
FIG. 5 is a front view of a cutter cartridge.

The cutter cartridge 4 detachably attached to the cartridge holder 32 is formed into a cylindrical shape as a whole as shown in FIGS. 4 and 5. The cartridge holder 32 is disposed between the right and left shafts 36 and 35 of the carriage 19 and is formed into the shape of a rectangular box having an open front. The cartridge holder 32 has four support pieces 47 protruding laterally. Two of the support pieces 47 are formed on upper and lower rear portions of an outer surface of a right wall of the cartridge holder 32 respectively, and the other two support pieces 47 are formed on upper and lower rear portions of an outer surface of a left wall of the cartridge holder 32 respectively. The support pieces 47 are movably supported on the respective shafts 35 and 36, whereby the cartridge holder 32 is supported to be movable relative to the carriage 19. In this case, the support pieces 47 are located above the respective supports 34 and abut against the respective supports 34 from above, so that the lowered position of the cartridge holder 32 is controlled.

The cartridge holder 32 has an upper wall 48 formed with a circular opening (not shown) through which the cutter cartridge 4 is inserted from above. The cartridge holder 32 further has a lower wall 49 also formed with a circular opening 49a (see FIG. 4) through which the cutter cartridge 4 is inserted from above. The opening 49a has an inner peripheral wall which is formed into a tapered shape so that the cutter cartridge 4 is locked on the inner peripheral wall thereby to limit downward displacement of the cutter cartridge 4. A cover member 37 (see FIGS. 1 and 2) is mounted on the carriage 19 to cover the support pieces 47, the shafts 35 and 36 and the like except for the front and upper and lower portions of the cartridge holder 32.

A lever member 50 is mounted on the cartridge holder 32 to fix and release the cartridge holder 4. The lever member 50 includes right and left arms and an operating part. The operating part extends to join distal ends of the arms at the front side of the cartridge holder 32. The lever arms have proximal ends with shafts 50a formed integrally with the lever 50 respectively, as shown in FIGS. 3 and 4. The shafts 50a are fitted into holes 32a formed in the right and left sidewalls of the cartridge holder 32 respectively, with the result that the lever member 50 is supported to be pivotable about an axis extending in the right-left direction.

In this case, the lever member 50 is pivotable between an open position (as shown by alternate long and two short dashes line in FIG. 4) where the operating part is located at an upper position and a fixed position (as shown by solid line in FIG. 4) where the operating part is located at a lower position. The lever arms have engagement protrusions 51 formed on inner surfaces thereof to fix the cutter cartridge 4. When the lever member 50 is located at the open position, the engagement protrusions 51 are located so as to be prevented from abutting against the cutter cartridge 4, as shown in FIG. 4. Accordingly, the cutter cartridge 4 is operable to be attached to and detached from the cartridge holder 32. On the other hand, when the lever member 50 is located at the fixed position, the engagement protrusions 51 abut against the outer peripheral surface of the cutter cartridge 4 to depress the cutter cartridge 4 downward, so that the cutter cartridge 4 is fixed to the cartridge holder 32.

Figure 6:
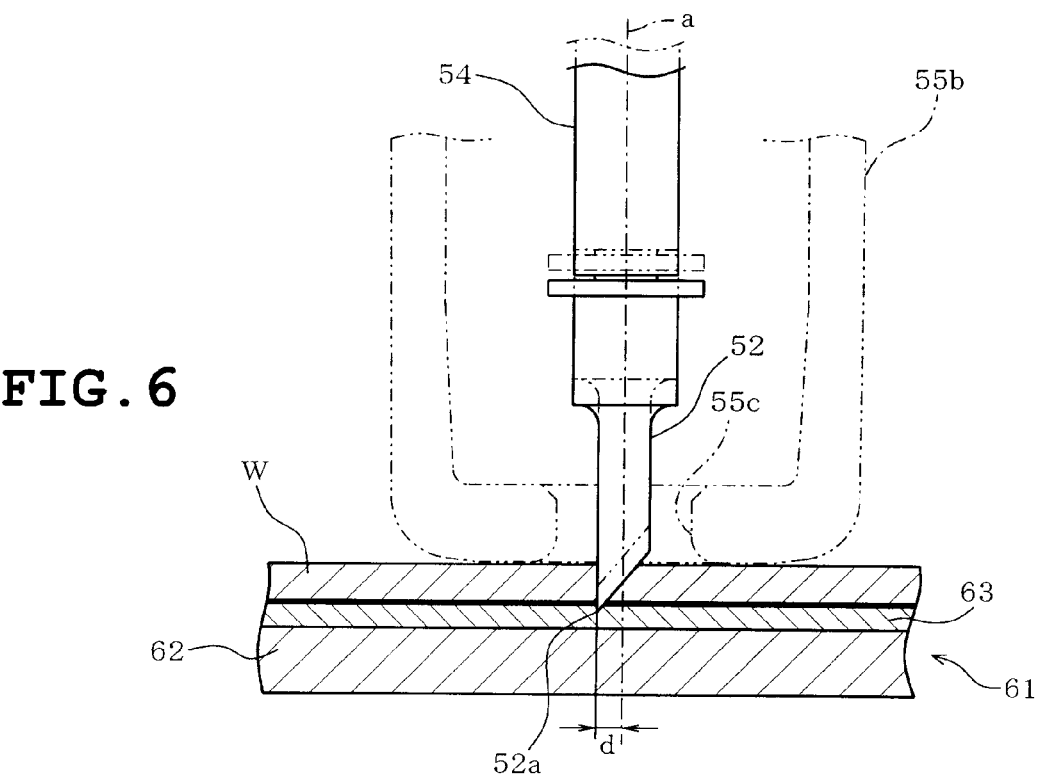
FIG. 6 is an enlarged longitudinal section of a cutter and its periphery, showing the condition during cutting.

The cutter cartridge 4 will now be described with reference to FIGS. 5 and 6. The cutter cartridge 4 includes a cutter 52 (see FIG. 6) serving as a cutting blade and a substantially cylindrical case body 53 for housing the cutter 52. The cutter 52 has a round bar-shaped cutter shaft 54 extending in the up-down direction and a generally V-shaped blade edge 52a inclining relative to the object W, as shown in FIG. 6. The blade edge 52a is eccentric by distance d relative to a central axis line a of the cutter shaft 54 as shown in FIG. 6. The cutter shaft 54 is supported on bearings provided in the case body 53 with the result that the cutter 52 is rotatable about the central axis line a, although the bearings are not shown.

The case body 53 is formed into a cylindrical shape and extends in the up-down direction. The case body 53 has an upper end formed with a grip 53a. A lower part of the case body 53 includes right and left sides formed with recesses 53b to escape from the engagement protrusions 51 respectively. A cap 55 is attached to a lower end of the case body 53. The cap 55 has a cylindrical shape such that a substantially upper half thereof is fitted with a lower outer periphery of the case body 53. The cap 55 includes a lower part having a tapered portion 55a and a smaller diameter portion 55b both formed integrally therewith. The engagement protrusions 51 of the lever member 50 engage an upper end of the cap 55 to depress the cutter cartridge 4 downward. The tapered portion 55a corresponds to a tapered shape of the inner surface of the opening 49a of the lower wall 49 of the cartridge holder 32. An underside of the smaller diameter portion 55b has a hole 55c formed through a central part thereof as shown in FIG. 6.

In this case, a lower outer periphery of the case body 53 is formed with a male thread although the male thread is not shown in detail. The cap 55 has an upper inner periphery formed with a female thread which is threadingly engaged with the male thread of the case body 53. More specifically, the male thread of the case body 53 is engaged with the female thread of the cap 55. As the result of the foregoing construction, the cap 55 is slightly moved in the up-down direction when the cap 55 is rotated relative to the case body 53. More specifically, when reference symbol "α" designates a dimension of projection of the blade edge 52a from the hole 55c of the smaller diameter portion 55b, the projection dimension α is adjusted by rotation of the cap 55, as shown in FIG. 5. In more concrete terms, the user can adjust the projection dimension α of the blade edge 52a according to a thickness and type of the object W to be cut by rotating the cap 55.

As the result of the foregoing construction, the engagement protrusions 51 are prevented from interfering with the cutter cartridge 4 when the lever member 50 of the cartridge holder 32 pivots to the upper open position. Accordingly, the user can detach the cutter cartridge 4 from the cartridge holder 32 by holding the grip 53a and pulling the cutter cartridge 4 upward. Further, the user can insert a new cutter cartridge 4 into the cartridge holder 32 from above. When the user causes the lever member 50 to pivot to the lower fixed position after insertion of the new cutter cartridge 4, the engagement protrusions 51 are engaged with the upper end of the lower cap 55. As a result, the cutter cartridge 4 is depressed downward, so that the tapered portion 55a adheres closely to the inner surface of the opening 49a of the lower wall 49 of the cartridge holder 32 thereby to be fixed. Thus, the user can attach and detach the cutter cartridge 4 to and from the cartridge holder 32.

The cartridge holder 32 to which the cutter cartridge 4 has been attached in the above-described manner is located at the raised position normally, that is, when no cutting operation is executed. In a cutting operation, the cartridge holder 32 is moved to the lowered position by the up-down moving mechanism 33. In this state, the blade edge 52a of the cutter 52 is pressed against the object W on the holding member 61 to penetrate through the object W, as shown in FIG. 6. In this state, the cutting head 5, namely, the cutter 52 are moved in the X direction by the cutter moving mechanism 8 while the object W held by the holding member 61 is moved in the Y direction by the transfer mechanism 7. The cutting operation is thus performed for the object W. After completion of the cutting operation, the holding member 61 (the object W) is discharged frontward from the front of the cutting apparatus 1 by the transfer mechanism 7.

In the embodiment, the cutting apparatus 1 is provided with the scanner 6 serving as an image scanning device which scans an image of the object W or the like, as shown in FIG. 2. The scanner 6 comprises a contact image sensor (CIS), for example. The scanner 6 includes a line sensor comprising a plurality of imaging elements arranged in the X direction side by side in a line, a light source such as lamp and a lens, all of which are formed integrally with the scanner 6. The scanner 6 is located behind the guide rail 21 and has a length substantially equal to a width of the holding member 61. The scanner 6 extends in the X direction while being directed downward.

The scanner 6 scans an image of a surface (an upper surface) of the object W while the holding member 61 is being moved rearward on the platen 3 by the transfer mechanism 7. More specifically, the scanner 6 scans an image of the object W held by the holding member 61 and displays the scanned image on the display 9a. The scanner 6 is further used to scan an image of original of cutting data to generate the cutting data. Furthermore, the scanner 6 is used to scan images of markers of the holding member 61 to carry out determination of a type of the holding member, operation control and the like as will be described later. The scanner 6 is controlled by a control circuit 71 (see FIG. 7) which will be described later.

Figure 8A:
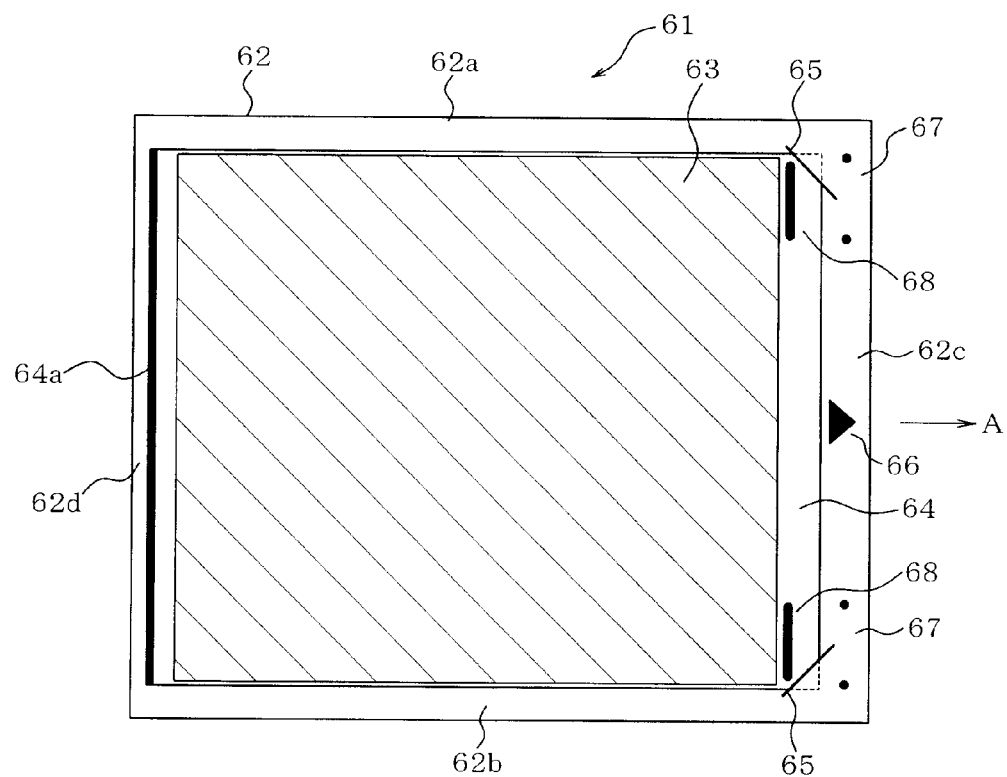
FIGS. 8A and 8B are a plan view of the holding member and a perspective view of the holding member with a transparent sheet being open.
Figure 8B:
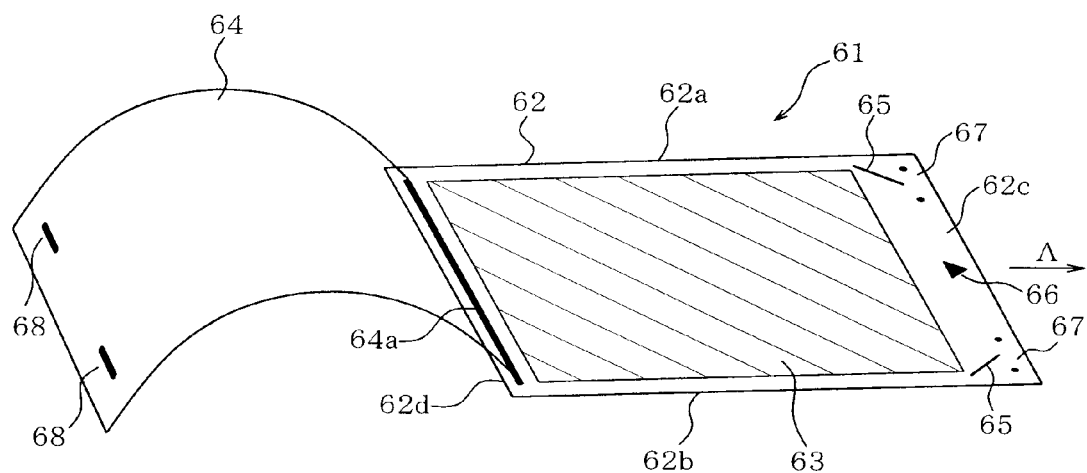

The holding member 61 will be described. The holding member 61 includes a base 62 made of a soft synthetic resin and formed into the shape of a rectangular sheet slightly longer in the front-back direction, as shown in FIGS. 1, 8A and 8B. The holding member 61 further includes an adhesive part (as shown by slash lines for convenience). The adhesive part 63 is formed by applying an adhesive agent to an inner rectangular region of an upper surface of the base 62 except for right and left ends 62b and 62a and front and rear sides 62c and 62d. The rear side in the insertion direction or in the direction of arrow A in FIG. 1 is referred to as "first side" 62d and the front side in the insertion direction is referred to as "second side" 62c.

The sheet-shaped object W such as paper or cloth is affixed to the adhesive part 63, so that the object W is removably held, as shown in FIG. 6. In this case, an adhesive power of the adhesive part 63 is set so that the object W is immovably held in the cutting work and in the scanning work and so that the object W can easily be removed after each work. Since FIG. 6 shows holding member 61 in the case where the transparent sheet 64 is located at the open position (see FIG. 8B), the transparent sheet 64 is not shown in FIG. 6 as will be described in detail later. Further, an X-Y coordinate system with any one of corners of the adhesive part 63 serving as an origin O, for example is set in the holding member 61, as shown in FIG. 1. A cutting operation as will be described later, and other operations are controlled based on the X-Y coordinate system.

A transparent sheet 64 is provided on the upper side of the base 62 as shown in FIGS. 1, 8A and 8B. The transparent sheet 64 is provided for covering an upper side of the object W placed on the adhesive part 63 and sandwiching the object W thereby to hold the object W. The transparent sheet 64 comprises a transparent soft synthetic resin sheet. The transparent sheet 64 is formed into a rectangular shape and is slightly larger than the adhesive part 63 but slightly smaller than the base 62. The transparent sheet 64 includes a side of a proximal end, that is, a rear side which is bonded onto the first side 62d of the base 62 by a linear bonded part 64a (as shown by bold line). More specifically, the rear side of the transparent sheet 64 is bonded to the first side 62d of the base 62 by thermal welding or by a bonding agent.

Consequently, the transparent sheet 64 is movable between a closed position as shown in FIGS. 1 and 8A and an open position as shown in FIG. 8B. When located at the closed position, the transparent sheet 64 covers the overall adhesive part 63 while adherent to the adhesive part 63. When the transparent sheet 64 is located at the open position, a distal end of the transparent sheet 64 is raised so as to be turned up from the base 62 with the result that the adhesive part 63 is exposed. Further, the second side 62c of the base 62 is formed with two slits 65 into which right and left corners of the distal end of the transparent sheet 64 are inserted thereby to be locked. In more concrete terms, the slits 65 are each formed into the shape of a diagonally extending cutout, and the corners of the transparent sheet 64 located at the closed position are inserted into the respective slits 65, so that the corners of the transparent sheet 64 are prevented from being turned up. Of course, the scanner 6 is capable of scanning an image of the upper side of the object W placed on the adhesive part 63 through the transparent sheet 64.

The base 62 of the holding member 61 includes the second side 62c as described above. A direction sign 66 is provided on the upper side of the second side 62c located frontward with respect to the insertion direction. The direction sign 66 is located at a central part of the upper side of the second side 62c with respect to the right-left direction. The direction sign 66 indicates the insertion direction (direction of arrow A) of the holding member 61 relative to the cutting apparatus 1 and is a triangular mark. Further, first signs 67 indicative of a type of the holding member 61 are provided on right and left portions of the upper side of the second side 62c respectively. Each first sign 67 includes two small black circles arranged in the right-left direction. The scanner 6 scans the first signs 67, so that the control circuit 71 discriminates the type of the holding member 61 based on the scanning of the first signs.

On the other hand, two second signs 68 are provided on right and left portions of the distal end of the transparent sheet 64 respectively, as shown in FIGS. 1, 8A and 8B. The second signs 68 indicate that the transparent sheet 64 is located at the closed position. Differing from the first signs 67, each second sign 68 comprises a rectangular mark elongate in the right-left direction. The second signs 68 are provided to be located slightly behind the first signs 67 when the transparent sheet 64 is located at the closed position. The scanner 6 scans the second signs 68, so that the control circuit 71 determines whether or not the transparent sheet 64 is located at the closed position, based on the reading of the second signs. Thus, the scanner 6 serving as the image scanning device also serves as a detection device for detecting the first signs 67 and the second signs 68.

In more concrete terms, the direction sign 66 and the first signs 67 are marks printed on the base 62, and the second signs 68 are marks printed on the transparent sheet 64.

In the embodiment, a holding member for cutting purpose is also prepared which is used only for the cutting separately from the above-described holding member 61 although not shown in the drawings. The cutting holding member includes a base and an adhesive part as the holding member 61. The base of the cutting holding member has the same size and shape as the base of the holding member 61. The adhesive part of the holding member for cutting purpose has the same size, shape and adhesive power as the adhesive part of the holding member 61. However, the cutting holding member has no transparent sheet. Further, the cutting holding member has a front end provided with a direction sign and a first sign indicative of the type thereof as the holding member 61. The direction sign of the cutting holding member is the same as the direction sign 66 of the holding member 61. On the other hand, the first sign of the cutting holding member comprises a single black circle, differing from the first sign 67 of the holding member 61. The scanner 6 scans the first sign of the cutting holding member, so that the control circuit 71 discriminates the cutting holding member, based on the scanning of the holding member for cutting purpose.

Figure 7:
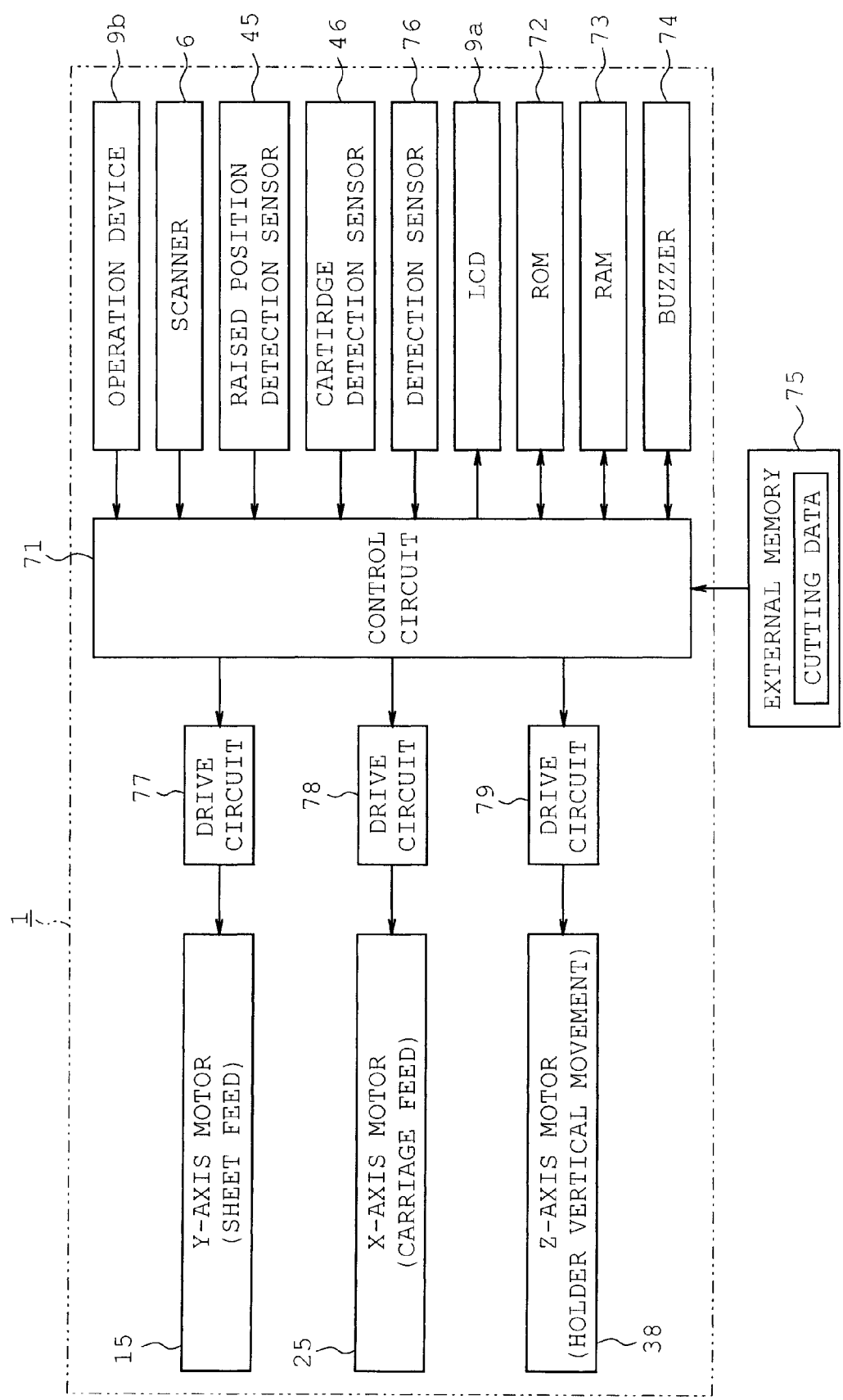
FIG. 7 is a schematic block diagram showing an electrical arrangement of the cutting apparatus.

The arrangement of control system of the cutting apparatus 1 will now be described with reference to FIG. 7. The control circuit 71 serving as a control unit controlling the entire cutting apparatus 1 is configured to be computer-centric or CPU-centric. A ROM 72, a RAM 73, a buzzer 74 and an external memory 75 are connected to the control circuit 71. The ROM 72 stores various control programs including a cutting operation control program to control the cutting operation, a cutting data generating program and a display control program to control the display 9a. The RAM 73 temporarily stores data and programs necessary for various processes. The cutting operation control program may be stored in a non-transitory computer-readable storage medium such as optical disk and may be given to the cutting apparatus 1 in the stored state.

A scanned image signal is supplied from the scanner 6 to the control circuit 71, and operation signals are also supplied from the switches of the operation switch device 9b to the control circuit 71. Further, signals are supplied from the raised position detection sensor 45 and the cartridge detection sensor 46 to the control circuit 71. Still further, to the control circuit 71 is supplied a signal from the detection sensor 76 detecting insertion of a front end of the holding member 61 from the front between the driving roller 12 and the rollers 13a. The external memory 75 stores cutting data to cut a plurality of types of patterns. The cutting data includes basic size information, cutting line data and displaying data. The basic size information is represented by values indicative of vertical and horizontal sizes of patterns and is configuration data corresponding to configurations of patterns. The cutting line data is data of X-Y coordinate values indicative of apexes of a cutting line composed of a plurality of line segments and is defined by the X-Y coordinate system of the cutting apparatus 1.

The display (LCD) 9a is also connected to the control circuit 71. The display 9a is configured to display a mode selecting screen, a pattern selecting screen, an arrangement display screen and the like. While viewing the screen of the display 9a, the user operates various switches of the operation switch device 9b, so that the user can select an operating mode or a desired pattern or set a cutting location. The control circuit 71 further controls the buzzer 74. In the embodiment, the user is informed of the holding member 61 by the display 9a and the sounding of the buzzer 74, as will be described later. Accordingly, the display 9a and the buzzer 74 function as an informing device.

Drive circuits 77, 78 and 79 driving the Y-axis motor 15, the X-axis motor 25 and the Z-axis motor 38 respectively are connected to the control circuit 71. Upon execution of the cutting operation control program, the control circuit 71 controls the Y-axis motor 15, the X-axis motor 25 and the Z-axis motor 38 to automatically execute the cutting operation and the like for the object W on the holding member 61. The control circuit 71 controls operations of various mechanisms and devices based on the cutting data of the pattern, that is, cutting line data when the operation of cutting a pattern out of the object W is executed, the control circuit 71 controls operations of various mechanisms and devices. More specifically, the cutting head 5 and accordingly, the cutter 52 are moved in the X direction by the cutter moving mechanism 8 under the control of the control circuit 71 while the holding member 61 holding the object W or the cutting holding member is moved in the Y direction by the transfer mechanism 7. As a result, the object W is cut along an outline of the pattern.

When the scanner 6 performs an image scanning operation, the holding member 61 holding the object W whose image is to be scanned is moved by the transfer mechanism 7 to the rearward of the platen 3 in the Y direction under the control of the control circuit 71. A reading operation is carried out by the scanner 6 in synchronization with the movement of the holding member 61, so that the control circuit 71 obtains a scanned image of the object W. The control circuit 71 processes the image scanned by the scanner 6 by a known image processing technique thereby to extract an outline of the object W, a pattern configuration and the like. In case that the outline of the object W and a pattern configuration blur, the scanner 6 is unable to accurately scan the outline and the pattern configuration. In this case, the user can draw lines on the surface of the transparent sheet 64 along the outline and the pattern configuration with a pen. As a result, the scanner 6 can accurately scan the drawn lines instead of the outline and the pattern configuration.

The control circuit 71 performs the following processes in executing the cutting operation control program as will be explained in the description of working of the cutting apparatus 1 (explanation of flowcharts). More specifically, when the detection sensor 76 detects insertion of the holding member 61 into the cutting apparatus 1, the control circuit 71 firstly drives the transfer mechanism 7 to transfer the holding member 61 and causes the scanner 6 to perform a process of scanning the first signs 67 of the holding member 61, determining a type of the first signs 67. More specifically, the control circuit 71 determines whether or not the holding member inserted into the cutting apparatus 1 is the holding member 61.

When the first signs 67 cannot be detected, the control circuit 71 causes the display 9a to display an error message saying "The insertion direction of the holding member is erroneous" or "The holding member is not a normal holding member." With this, the control circuit 71 causes the buzzer 74 to sound, thereby informing of error.

When the scanner 6 has detected the first signs 67, the control circuit 71 determines that the holding member inserted into the cutting apparatus 1 is the normal holding member 61 and the holding member has been inserted in the correct direction. Subsequently, the control circuit 71 drives the transfer mechanism 7 to move the holding member 61 backward to a retreat position or a position where only the distal end of the holding member 61 is held between the driving roller 12 and the roller 13a.

On the other hand, when the holding member for cutting purpose has been inserted into the cutting apparatus 1, the scanning process is performed in the same manner as described above, so that the first signs of the holding member for cutting purpose is scanned, whereby the control circuit 71 discriminates the holding member for cutting purpose. The control circuit 71 continuously performs the cutting operation for the object W held by the holding member for cutting purpose.

When receiving an instruction to perform the cutting operation while the holding member 61 is located at the retreat position, the control circuit 71 drives the transfer mechanism 7 to transfer the holding member 61, executing a process of scanning the second signs 68. When the scanner 6 has detected the second signs 68, the control circuit 71 causes the display 9a to display a message saying "The cutting operation is nonexecutable." With this, the buzzer 74 is sounded to inform of error. On the other hand, when the second signs 68 have not been detected, the control circuit 71 executes the cutting operation. In this case, detection of the second signs 68 is performed only when the first signs 67 of the holding member 61 have been detected.

The working of the cutting apparatus 1 constructed as described above will now be described with reference to FIGS. 9 to 11. Firstly, a case will be described where the user causes the cutting apparatus 1 to perform a process of scanning an image of the object W on which an original picture is drawn, for the purpose of generation of cutting data. The user once opens the transparent sheet 64 of the holding member 61 into the open position and affixes the object W to be read onto the adhesive part 63, so that the object W is held by the holding member 61. Subsequently, the transparent sheet 64 is closed into the closed position. In this case, the corners of the transparent sheet 64 are inserted into the slits 65 respectively with the result that the corners of the transparent sheet 64 can be prevented from being turned up. The object W is reliably held while being sandwiched between the base 62 and the transparent sheet 64. In this state, the user inserts the front end of the holding member 61 into the cutting apparatus 1 in the direction of arrow A. When viewing the direction sign 66 in this case, the user can insert the holding member 61 into the cutting apparatus 1 in a correct direction.

Further, when the user desires to cause the cutting apparatus 1 to perform a cutting operation for the object W, the transparent sheet 64 is opened into the open position and affixes the object W onto the adhesive part 63 so that the object W is held by the holding sheet 61. The front end of the holding member 61 is inserted into the cutting apparatus 1 with the transparent sheet 64 being maintained in the open state. However, the cutting operation should not be executed when the user has inserted the holding member 61 into the cutting apparatus 1 while the transparent sheet 64 is erroneously located at the closed position.

Figure 9:
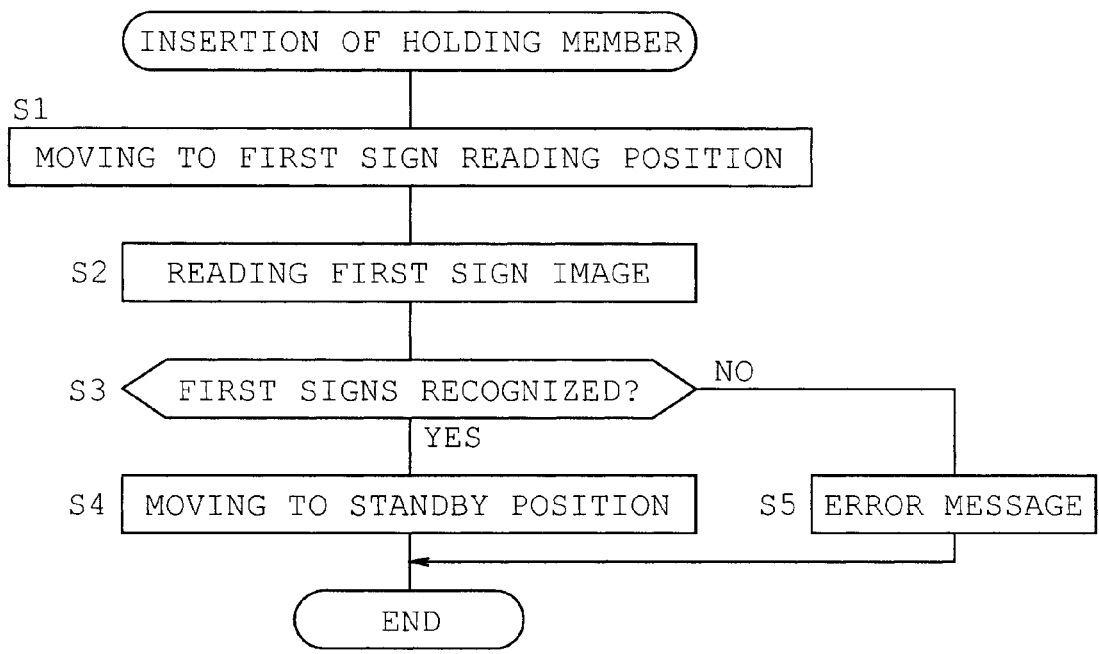
FIG. 9 is a flowchart showing a process of detecting a first marker, executed by a control circuit.

FIG. 9 is a flowchart schematically showing a procedure of process of detecting the first signs 67 firstly performed by the control circuit 71 when the holding member 61 is inserted into the cutting apparatus 1. Further, FIG. 10 is a flowchart showing a procedure of process performed by the control circuit 71 when the user instructs start of the cutting operation. FIG. 11 is a flowchart showing a detailed procedure of the process (step S12) of recognizing the second signs 68 in the process shown in FIG. 10.

More specifically, the processing shown in FIG. 9 starts when the detection sensor 76 has detected insertion of the holding member 61 into the cutting apparatus 1. At step S1 the holding member 61 is fed by the transfer mechanism 7 rearward in the Y direction to a position where the first signs 67 are scanned, that is, a position where the distal end of the holding member 61 is located beneath the scanner 6. At step S2, the scanner 6 performs image scan of the first signs 67. At step S3, the first signs 67 are recognized on the basis of image data, namely, the type of the holding member 61 is identified. When the type of the holding member 61 has been identified (YES at step S3), the holding member 61 is moved to the standby position into a standby state at step S4.

In this case, the holding member 61 is identified when the first signs 67 each composed of two black circles are detected, as described above. When the first signs each composed of a single black circle are detected, the holding member inserted into the cutting apparatus 1 is identified as the holding member dedicated to cutting. Further, there is a case where the first signs cannot be detected (recognized) at step S3. For example, the holding member 61 is erroneously inserted backwards into the cutting apparatus 1 or a holding member which is provided with no first signs and is accordingly not normal is inserted into the cutting apparatus 1. Thus, when the first signs 67 are not detected (NO at step S3), the control circuit 71 proceeds to step S5 where the display 9a displays an error message saying that the insertion direction of the holding member 61 is erroneous or that the holding member is not normal, and the buzzer 74 is sounded, so that the user is informed of error. Subsequently, the holding member whose insertion direction is erroneous or which is not normal is fed frontward to be discharged.

Figure 10:
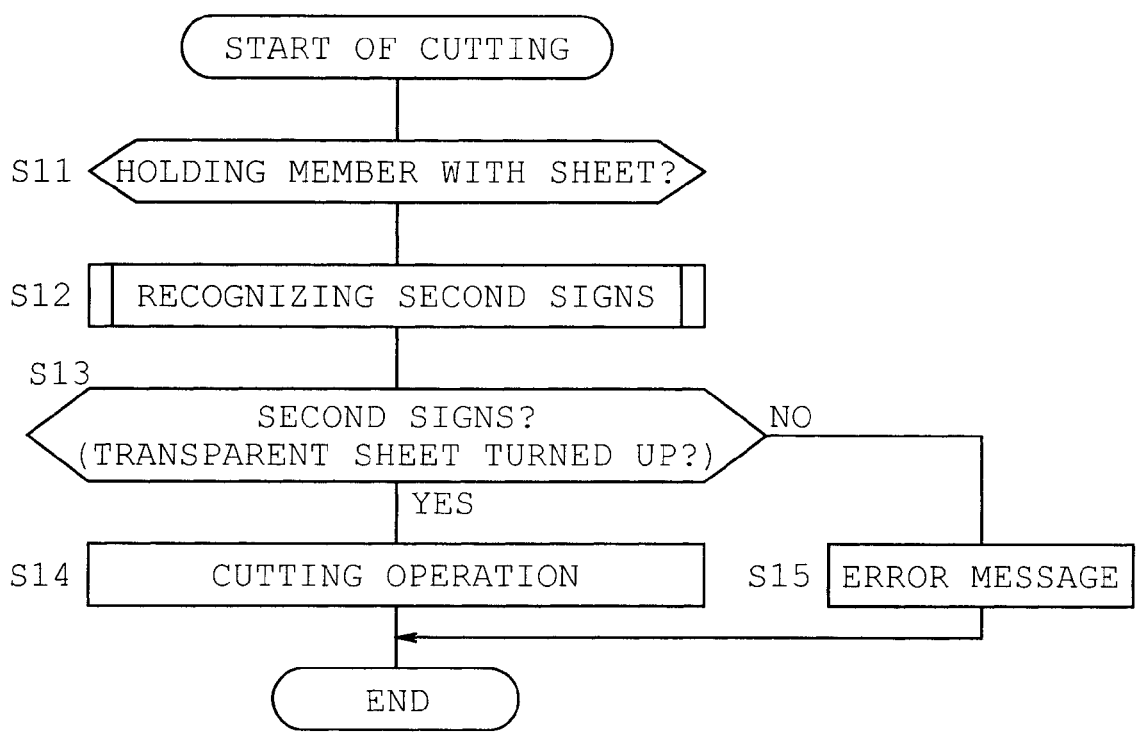
FIG. 10 is a flowchart showing a processing procedure in execution of a cutting operation executed by the control circuit.
Figure 11:
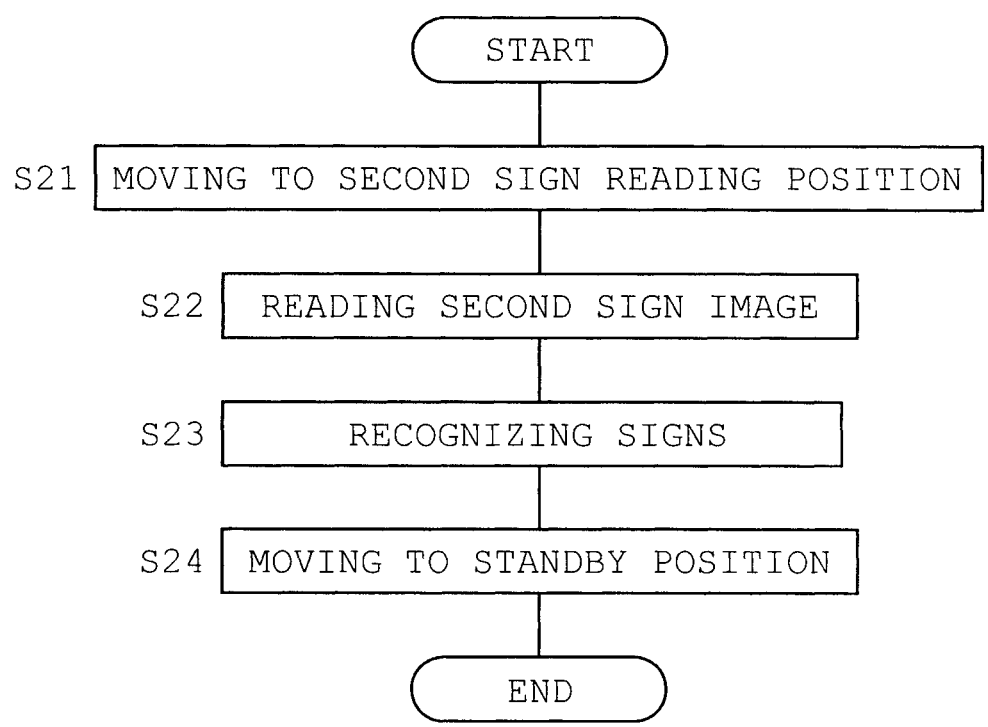
FIG. 11 is a flowchart showing a more detailed processing procedure in execution of the cutting operation executed by the control circuit.

The process shown in FIG. 10 is performed when the user operates one or more operation switches of the switch device 9a to instruct start of the cutting operation after detection of first signs 67, namely, recognition of the holding member 61. Firstly, at step S11, the control circuit 71 determines whether or not the type of the holding member identified at step S3 is the holding member 61 with the transparent sheet 64. When the identified holding member is not the holding member with the transparent sheet, that is, when the identified holding member is the holding member for cutting purpose (NO at step S11), the control circuit 71 proceeds to step S14 where the cutting operation is executed for the object W held by the holding member 61.

On the other hand, when the type of holding member identified at step S3 is the holding member 61 with the transparent sheet 64 (YES at step S11), the control circuit 71 proceeds to step S12 where a process of reading the second signs 68 is performed. Referring to FIG. 11 showing the reading process in more detail, the holding member 61 is fed by the transfer mechanism 7 rearward in the Y direction to a position where the first signs 67 are scanned, that is, a position where the position where the second signs 68 are scanned is located beneath the scanner 6. At step S22, the scanner 6 performs image scan of the second signs 68. At step S23, the second signs 68 are recognized on the basis of image data, namely, presence or absence of the second signs 68 is detected.

The second signs 68 are detected when the transparent sheet 64 is located at the closed position, as described above. No second signs 68 are detected when the transparent sheet 64 id located at the open position. When the second signs 64 are recognized, the holding member 61 is moved to the standby position into the standby state at step S24. Upon end of the process in FIG. 11 (the process at step S12 in FIG. 10), the control circuit 71 returns to the process in FIG. 10, proceeding to step S13. The control circuit 71 determines at step S13 whether or not the second signs 64 have been detected, namely, whether or not the transparent sheet 64 is located at the closed position. When no second signs 64 have been detected, that is, the transparent sheet 64 is located at the open position (NO at step S13), the control circuit 71 proceeds to step S14 where the cutting operation is performed for the object W held by the holding member 61. In this case, the cutting operation can be performed without cutting the transparent sheet 64.

On the other hand, when the second signs 64 have been detected, that is, when the transparent sheet 64 is located at the closed position (YES at step S13), the control circuit 71 proceeds to step S15 where the display 9*a* displays an error message saying that the cutting operation is nonexecutable, and the buzzer 74 is sounded, so that the user is informed of error. In this case, since the cutting operation is not performed, the transparent sheet 64 is prevented from being cut.

According to the holding member 61 in the embodiment, the bonded part 64*a* of the proximal end of the transparent sheet 64 is located at the first side 62*d* which is the rear side in the insertion direction of the base 62. Accordingly, when moved to the open position, the transparent sheet 64 can be retreated to the position where the transparent sheet 64 stays away from the adhesive part 63. Accordingly, the cutting operation can be performed while the transparent sheet 64 is turned up thereby to be open. As a result, the holding member 61 can be used both for image scan of the object W and for cutting.

In this case, the user can recognize the insertion direction and the type of the holding member 61 when viewing the direction sign 66 and the first signs 67 provided at the second side 62*c* which is the front side in the insertion direction of the base 62. Accordingly, the holding member 61 can be prevented from being inserted in the reverse direction, and the type of the holding member 61 can be prevented from being mistaken. Further, the second signs 68 are provided on the distal end of the transparent sheet 64. As a result, when confirming by sight the second signs 68 at the second side 62*c* of the base 62, the user can recognize that the transparent sheet 64 covers the base 62, that is, the transparent sheet 64 is located at the closed position. Consequently, since the user is easily aware of the transparent sheet 64 located at the closed position, the cutting operation can be prevented from being performed with the transparent sheet 64 being located at the closed position. Further, since the first and second signs 67 and 68 are optically detectable (recognizable), these signs 67 and 68 can automatically be detected thereby to be used for control.

Particularly in the embodiment, the base 62 is provided with the slits 65 into which the respective corners of the distal end of the transparent sheet 64 located at the closed position are inserted thereby to be stopped. This can prevent the distal end of the transparent sheet 64 from floating or being caught during insertion into the cutting apparatus 1 or during movement by the transfer mechanism 7.

According to the above-described embodiment, the cutting apparatus 1 includes the holding member 61 having the above-described first and second signs 67 and 68. The first and second signs 67 and 68 can automatically be detected by scanning by the scanner 6. With this, the control circuit 71 is configured to inform of error in the case where the first signs 67 of the holding member 61 or the first sign of the holding member for cutting purpose is not detected when the holding member 61 or the holding member for cutting purpose has been inserted into the cutting apparatus. As a result, the control circuit 71 can automatically determine that the insertion direction of the holding member 61 or the holding member for cutting purpose is erroneous or that the holding member is not normal. In this case, the image scan and the cutting operation can be prevented from being erroneously executed.

Particularly in the foregoing embodiment, when detecting the first and second signs 67 and 68, the control circuit 71 is configured to inform of error by causing the display 9*a* to display the message that the cutting operation is nonexecutable. When detecting the first signs 67 but not detecting the second signs 68, the control circuit 71 performs the cutting operation. As a result, the cutting operation for the object W is executable while the transparent sheet 64 is prevented from being cut by automatically detecting the position of the transparent sheet 64 of the holding member. In this case, since the detection of the second signs 68 is carried out only when the first signs 67 have been detected, useless detection can be prevented from being carried out. Further, the scanner 6 scanning the image of the object W is also used as the detecting mechanism for detecting the first and second signs 67 and 68. As a result, the construction of the cutting apparatus can be simplified as compared with the case where a separate detecting mechanism is provided.

Figure 12:
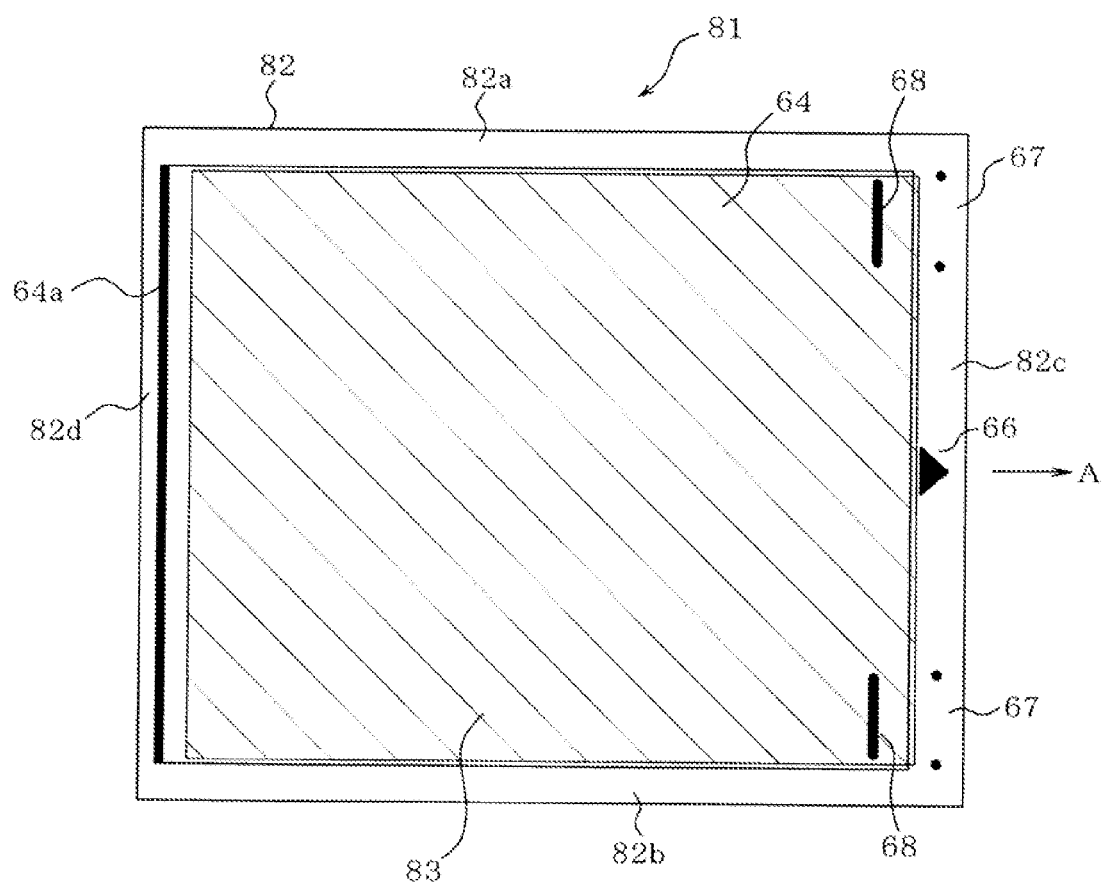
FIG. 12 is a plan view of the holding member employed in a second embodiment.

FIG. 12 illustrates a holding member 81 in a second embodiment. Identical or similar parts in each of embodiments which will hereinafter be described are labeled by the same reference symbols as those in the first embodiment, and detailed description of these identical or similar parts will be eliminated. Only the differences between the first and each one of the following embodiments will be described. The second embodiment differs from the first embodiment in the configuration of the holding member 81.

More specifically, the holding member 81 includes a base 82 formed of a relatively softer synthetic resin into the shape of a rectangular sheet slightly longer in the front-back direction and an adhesive part 83 (as shown by slash lines for convenience) on which the object W is removably placed. The base 82 includes right and left ends 82*a* and 82*b*, a front second side 82*c* with respect to the insertion direction and a rear second side 82*d* with respect to the insertion direction. The direction sign 66 indicative of the insertion direction relative to the cutting apparatus 1 is provided on the upper surface of the second side 82*c*. The first signs 67 indicative of the type of the holding member 81 are also provided on the upper surface of the second side 82*c*. The transparent sheet 64 is provided on the upper surface of the base 82 to be movable between the closed position and the open position. The transparent sheet 64 covers the upper side of the object W placed on the adhesive part 83 thereby to hold the object W. The transparent sheet 64 has a proximal end bonded to the first side 82d by a bonded part 64a (shown by bold line) and a distal end having the second signs 68.

No slits 65 are formed in the base 82 in the second embodiment. The adhesive part 64a provided on the base 82 is spread to the front side (rightward as viewed in the figure) to have a wider area as compared with the adhesive part 63 of the holding member 61 in the first embodiment. More specifically, the adhesive part 83 is sized such that an end of the adhesive part 83 is slightly exposed (protrudes) from the distal end of the transparent sheet 64 located at the closed position. According to the holding member 81 in the second embodiment, the distal end of the transparent sheet 64 can reliably adhere to the adhesive part 83. This can prevent the distal end of the transparent sheet 64 from floating or being caught during insertion of the holding member 81 into the cutting apparatus 1 or during movement of the holding member 81 in the Y direction by the transfer mechanism 7.

Figure 13:
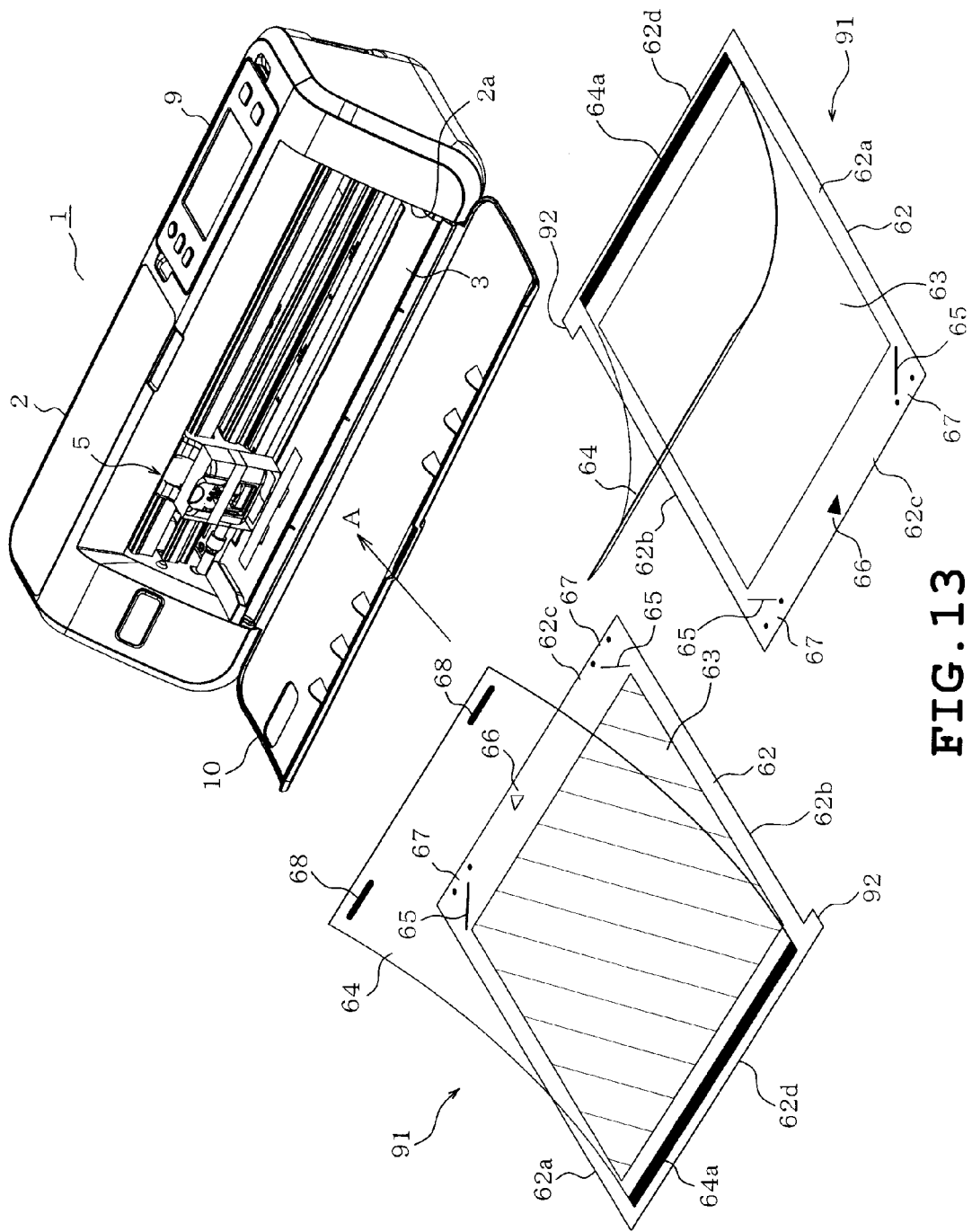
FIG. 13 is a perspective view showing a cutting apparatus and the holding members according to a third embodiment.

FIG. 13 illustrates a third embodiment. A holding member 91 in the third embodiment differs from the holding member 61 in the first embodiment in the following configuration. More specifically, a wrong insertion preventing protrusion 92 is formed integrally on an end of a side edge of the base 62, for example, on an end of a right edge 62b located at the first side 62d. In the embodiment, the wrong insertion preventing protrusion 92 is convex in the transverse direction (the X direction) that is perpendicular to the insertion direction (direction of arrow A). In this case, the holding member 91 is configured so that a width thereof inclusive of the protrusion 92 is larger than a widthwise dimension of the gap between the driving roller 12 and the rollers 13a of the pinch roller shaft 13, into which gap the holding member 91 holding the object is insertable (movable).

In the above-described configuration, the holding member 91 is insertable into the cutting apparatus 1 in a normal orientation, that is, with the second side 62c serving as the front. In this case, the protrusion 92 does not hinder the movement of the holding member 91 in the front-back direction (the Y direction) by the transfer mechanism 7 during image scan or cutting. However, when the holding member 91 is inserted back to front from the first side 62d, the protrusion 92 is caught, so that the insertion between the driving roller 12 and the rollers 13a is physically blocked.

The holding member 91 in the third embodiment can also achieve the same advantageous effect as the holding member 61 in the first embodiment. In addition, the provision of the protrusion 92 can reliably prevent wrong insertion into the cutting apparatus 1, such as back-to-front insertion. The wrong insertion preventing protrusion 92 may be provided on the left edge 62a. Two protrusions 92 may be provided on the right and left edges 62b and 62a respectively. Further, the protrusion can be provided to be convex upward or downward from the first side 62d.

The base of the holding member may be composed of heavy paper or a metal plate although the bases 62 and 82 are composed of the synthetic resin sheet in the foregoing embodiments. Further, the first and second signs 67 and 68 should not be limited to black circles and the rectangular shape. The signs 67 and 68 may be various characters, numerals, symbols, figures or the like when the type can be determined by image scan. Still further, the type may be determined by changing the colors of the signs. The cutting head 5, the cutter cartridge 4 and the scanner 6 of the cutting apparatus 1 may be modified into various forms. Thus, the foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

We claim:

1. A holding member comprising:
a base having an adhesive part on which a sheet-shaped object is removably placed, the base having a rectangular shape;
a transparent sheet configured to hold the object between the base and itself, the object being held by the holding member, the transparent sheet having a rectangular shape, the transparent sheet having a proximal end fixed to a rear part of the base with respect to an insertion direction of the holding member and being movable between a closed position where the transparent sheet is laid over the adhesive part and an open position where the adhesive part is exposed, the object being cut by a cutting apparatus when the transparent sheet is located at the open position, the object being scanned by an image scanning device included in the cutting apparatus when the transparent sheet is located at the closed position or the open position;
a first sign provided on the base to indicate a type of the holding member, the first sign being a mark optically detectable by an image scanning device included in a cutting apparatus;
a second sign provided on the transparent sheet to indicate that the transparent sheet is located at the closed position, the second sign being a mark optically detectable by the image scanning device; and
a third sign provided on the base to indicate the insertion direction of the holding member, wherein:
the second sign on the transparent sheet and the first and third signs on the base are located at a front part of the base with respect to the insertion direction of the holding member when the transparent sheet is located at the closed position; and
the adhesive part has a rectangular shape, and the first, second and third signs are located between a front end of the adhesive part with respect to the insertion direction and a front end of the base with respect to the insertion direction when the transparent sheet is located at the closed position.

2. The holding member according to claim 1, wherein the first sign is located at a downstream side relative to the second sign in the insertion direction when the transparent sheet is located at the closed position.

3. The holding member according to claim 1, wherein the transparent sheet is formed to be smaller in shape than the base, and the base is provided with a slit into which a corner of the transparent sheet located at the closed position is inserted thereby to be stopped.

4. The holding member according to claim 1, wherein the adhesive part is sized such that an end of the adhesive part is exposed from an end of the transparent sheet when the transparent sheet is located at the closed position.

5. The holding member according to claim 1, wherein the base is provided with a wrong insertion preventing protrusion which is convex in a direction intersecting with the insertion direction.

* * * * *